May 11, 1926.

W. P. RAWN 1,584,142

UNDERDRAIN FOR TRICKLING FILTERS

Filed Nov. 10, 1924   2 Sheets-Sheet 1

INVENTOR:
William P. Rawn
By Jones, Addington, Ames & Seibold
ATTORNEYS

May 11, 1926.

W. P. RAWN 1,584,142

UNDERDRAIN FOR TRICKLING FILTERS

Filed Nov. 10, 1924    2 Sheets-Sheet 2

INVENTOR:
William P. Rawn
BY Jones, Addington, Ames & Seibold
ATTORNEY.

Patented May 11, 1926.

1,584,142

UNITED STATES PATENT OFFICE.

WILLIAM P. RAWN, OF WASHINGTON, IOWA, ASSIGNOR OF ONE-THIRD TO E. G. NELSON AND ONE-THIRD TO A. J. LARSON, OF WHAT CHEER, IOWA.

UNDERDRAIN FOR TRICKLING FILTERS.

Application filed November 10, 1924. Serial No. 748,879.

My invention relates broadly to sewage treatment, and has special reference to an improved underdrain for trickling filter permitting efficient filtration without putrefaction of the organic matter.

Briefly my invention distinguishes from the prior art by an efficient and simplified construction. It is commonly known that in the treatment or purification of sewage the purity of the effluent resulting from downward intermittent filtration depends on a biological action requiring an efficient supply of oxygen. In the absence of such supply, brought into contact with the effluent, oxidation of the organic matter fails and offensive odors are produced during filtration. I have found that oxidation changes the organic matter into either a mineral or stable organic matter, which, under ordinary conditions, do not undergo any change giving up undesirable odors.

During the sewage treatment, bacterial jelly adheres to the surfaces of the filtering material. When in a mature condition, the filtering material will be found to be coated from top to bottom by the bacterial jelly. The dissolved organic matter in the liquid sewage is either absorbed by the bacterial jelly, or acted upon directly. It has been noticed that there is a periodic storage and disgorging of these transformed solids, and, if a free passage is not provided, the system must be shut off and the filtering material removed and cleaned. It may be mentioned that the periodic disgorging of the solids is due to a community of innumerable living organisms being affected by the seasons and responding quickly to temperature changes. Heretofore in the art, difficulty has been experienced in properly providing for a free passage of the transformed solids. Furthermore, difficulty has been experienced in providing an adequate and efficient supply of oxygen during the period in which the organic matter is undergoing a change to mineral or stable organic matter, with the result that undesirable and offensive odors would be given off. So far as I am aware, the prior art in construction of trickling filters for sewage treatment provided as drainage and air supply a plurality of inverted U-shaped tile blocks spaced apart a predetermined distance to permit the air below to permeate upwardly through the filtering material. The chief difficulty with such a construction is that the bacterial jelly and other matter together with the liquid filtering through clogs and spreads over the floor of the filter in and between the tile to a uniform depth, thereby covering the space between the tiles and cutting off all circulation of air from below. Moreover, no defined flow could result and the entire system was incapable of being flushed, particularly when the solids were disgorged.

Primarily, the object of my invention is to obviate the above difficulties and includes the provision of improved tile blocks in the form of troughs which allow efficient circulation of air through the filtering material and an open passage leading to the discharge pipe of the filter for the liquid and transformed solids. A further object is to construct the troughs in a novel manner so as to obtain rapid discharge of the effluent therefrom. This is obtained by forming the surface of the troughs circular or like the lower half of a horizontal tube in order to obtain a minimum surface contact and a resultant increased velocity flow. A further object of my invention consists in the manner in which the troughs are supported, and further in the fact that the ends are thereby provided open so that inspection and cleaning may be permitted without requiring removal from their foundation. I prefer to provide them permanently embedded in concrete, so that the underdrain construction will be of a permanent character for securely maintaining the tile in place.

With the forms of construction heretofore used in the art the alignment of the channels has been difficult or impossible to attain, and in the progress of construction the placing of the filtering material shifts the troughs or tiles out of line forming an impediment to flow of liquids, and impairing the efficient operation of the drain. In the construction of a filter using my invention, I prefer to place the series of troughs end to end upon the floor or base provided, spacing the same laterally a predetermined distance, and the construction of the troughs is such as to permit securing definite and permanent alignment thereof. By the use of the troughs with the lateral extension 18 at bottom of base the concrete poured between the troughs will be superimposed upon the lateral projections 18 and thus avoiding floating or disturbing the troughs during construction. If construction be attempted by the use of U-shaped troughs substantially like the trough herein described without the lateral projections forming parts of the base, there will be a tendency to float or disturb the troughs when the concrete is poured between them. After the troughs and channels are imbedded in the concrete and the concrete has set to permit further work, the channels are cleaned and loose material removed therefrom, then the cover plates are placed, insuring clean open drainage channels before the filtering material is placed thereon.

A further feature of my invention consists in the provision of apertured plates over the troughs which form the cover and support for filtering material.

I further desire to provide the apertures with an upward taper, so that material passing therethrough will not tend temporarily to clog the apertures. The following advantages are the result of my invention:

(A) An abundant air supply for the filtering material, and consequently, the assurance of a biological action, which will prevent putrefaction;

(B) Prompt and free discharge of liquids, avoiding ponding or stagnation thereof in the filter;

(C) Provision of a definite passage through the filtering bed, for air and for the effluent or liquids to be treated;

(D) Freedom from clogging;

(E) Accessibility for cleaning; and (F) A simple and durable underdrain trickling filter, capable of functioning efficiently at all times.

In order to apprise those skilled in the art how to construct and practice my invention, I shall now describe an embodiment thereof in connection with the accompanying drawings which form a part hereof.

Figure 2:
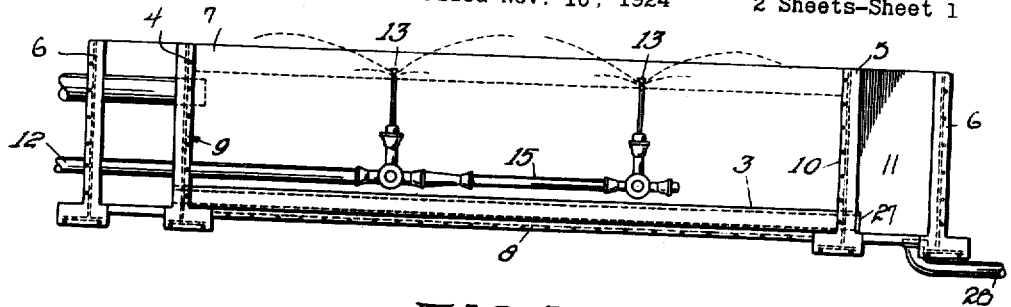
Fig. 2 is a vertical sectional view taken on line 2—2 in Fig. 1.

As illustrated in the drawings, the trickling filter comprises a filtering bed 3 having the end walls 4 and 5 and the side walls 6 and 7. The walls are preferably formed integrally with a floor 8. If so desired, a sludge drying bed 9 may be provided adjacent the side wall 6 for receiving sludge that has been removed from the sewage in the primary treatment tanks. At the ends of the filtering bed, inspection galleries 10 and 11 are provided. The effluent from the trickling filter is collected by the underdrain system and is discharged into inspection gallery 11, which is so constructed as to drain to outlet sewer 28. Inspection gallery 10 is used, also, as a place to introduce flushing appliances into underdrain. Effluent from primary treatment tanks is conducted to the filtering bed by means of a pipe 12 communicating with suitable spray nozzles 13 by means of the connections 14 and branch pipes 15.

Figure 1:
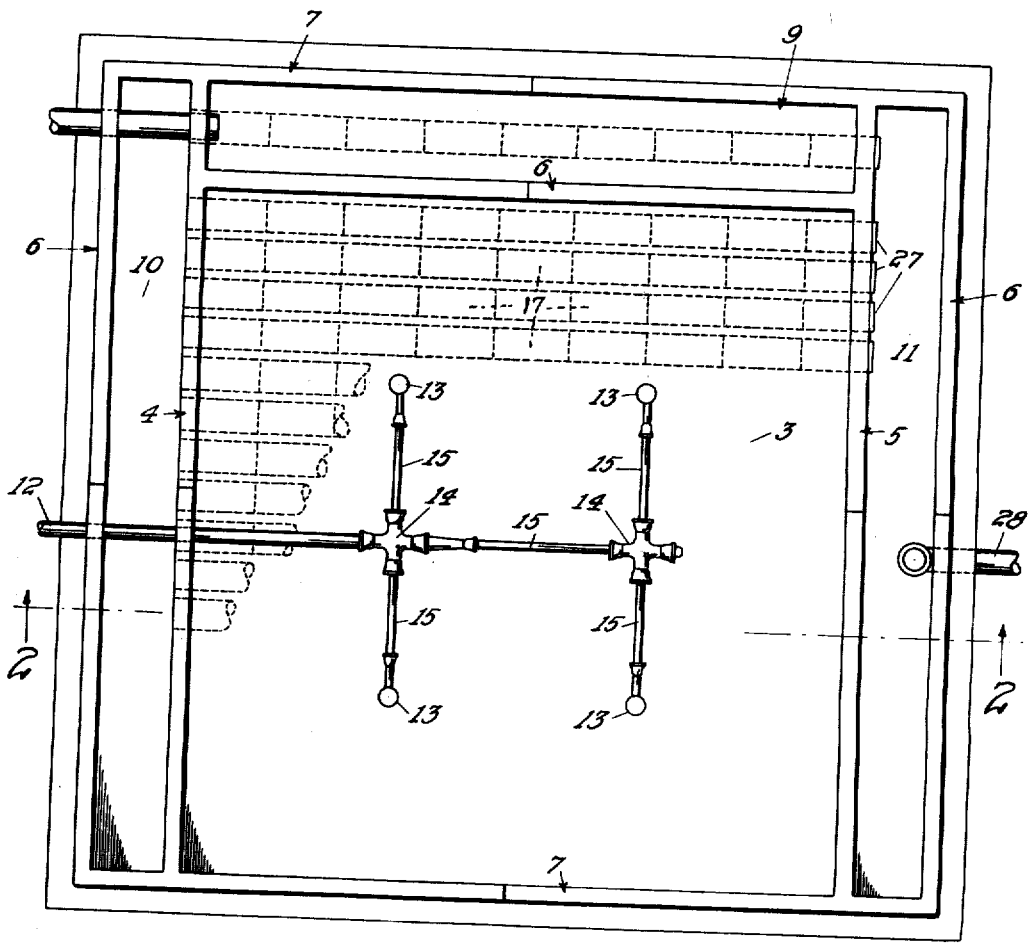
Figure 1 is a top plan view of a trickling filter underdrain construction embodying my invention.
Figure 3:
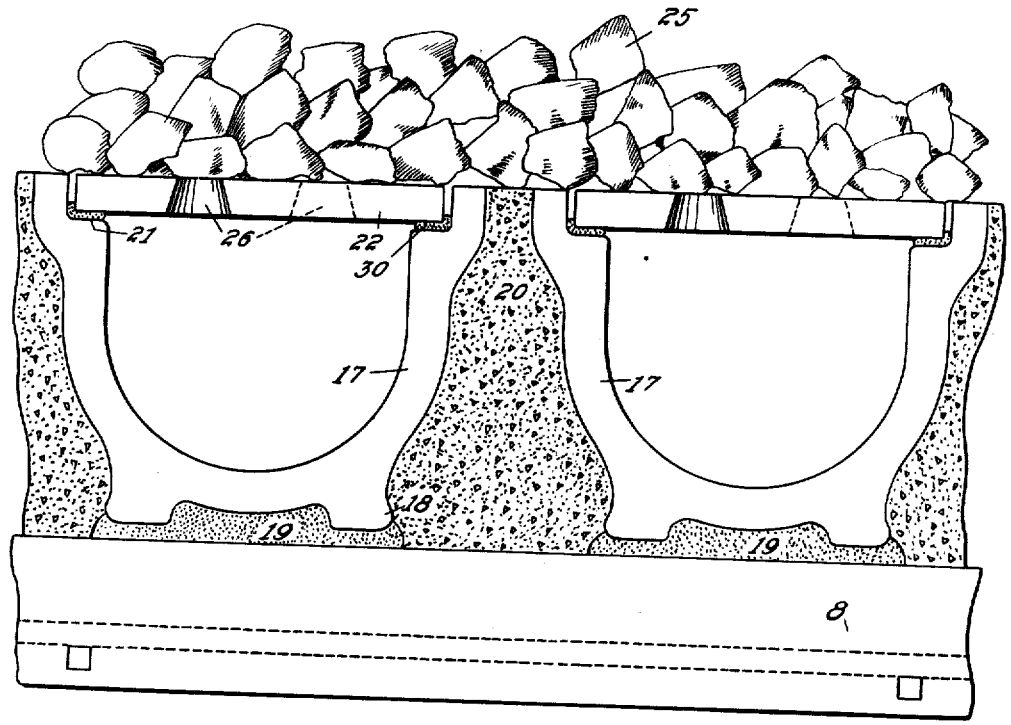
Fig. 3 is an enlarged cross-sectional view illustrating the manner of embedding the tile troughs in concrete.
Figure 4:
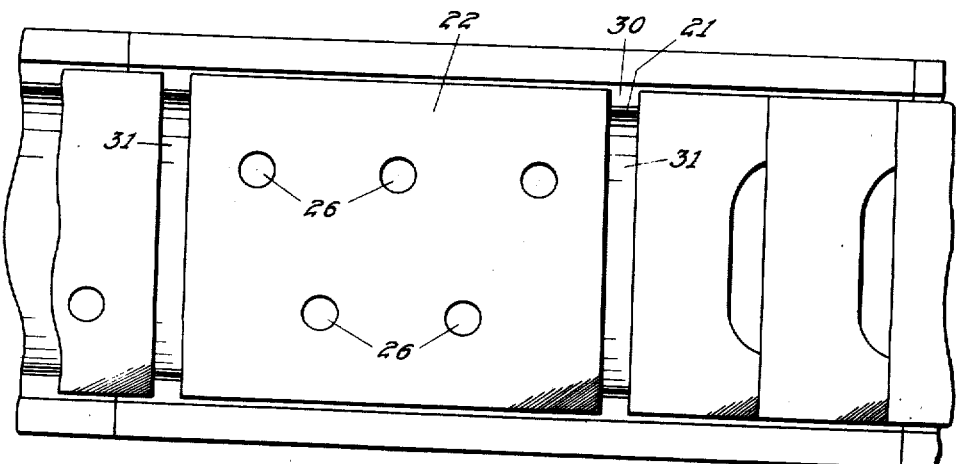
Fig. 4 is a top view thereof. On the right of the drawing is shown one form of suitable construction of the cover plate, and on the left of the drawing is shown another suitable form of such cover plate.

As illustrated in Fig. 3, the underdrain construction comprises a plurality of tile troughs 17 placed end to end to form underdrain channels which are arranged in rows and communicate with the inspection galleries 10 and 11. Tile troughs 17 are preferably U-shaped and are furnished with feet 18 which rest on a bed of mortar 19 poured along the floor 8. Concrete 20 is then poured between the tile troughs and is brought flush with the top of the troughs. Hence, the tile troughs 17 are solidly embedded in the concrete. Shoulders 21 are provided along the inner side of the troughs for receiving a plurality of cover plates 22. These plates are preferably flush with the tops of the troughs and the concrete so that a flat surface may be presented to the filtering material 25 illustrated in Fig. 3. Apertures 26 are provided in plates 22 and are tapered upwardly so as to present the smaller end of the opening to the filtering material. With these apertures formed in this manner, I find that it is impossible for any of the transformed solids, when periodically disgorged from the filtering material, to clog the apertures 26. Moreover, the effluent filtering downwardly through the filtering material finds a quick passage into the tile troughs. The foregoing is descriptive of the construction shown on left side of Fig. 4. If the construction shown on right side of Fig. 4 is used, the apertures are formed by the shaping of the pieces used. These pieces are suitably formed and set side by side on the shoulders 21. I preferably provide the interior surface of the trough 17 semi-circular so that its contacting area may be reduced to a minimum to increase the velocity of flow. This is particularly desirable when the underdrain construction is flush, say at a time when the transformed solids are unloaded from the filtering material, inasmuch as a rapid and continuous flow is preferable to carry off all fluid and matter from the channels to prevent clogging. This is true at any time, however, as the water within the channel should never stand, nor rise to a level which would prevent a circulation of air below the plates 22. It will be noted in Fig. 1 the parallel channels 27, formed by the tile troughs 17 being placed end to end, open into both inspection galleries 10 and 11, but they preferably drain into the gallery 11, which is provided with a drain pipe 28.

The tile covers 22 may be temporarily secured in position by cement 30. As illustrated in Fig. 4, these covers may be spaced a slight distance apart in order to provide openings 31 which assist in the drainage of the effluent and also the transformed solids from the filtering material in the troughs 17. By this arrangement, the circulation of air from below into the filtering material 25 is facilitated, so that a sufficient supply of oxygen is assured. By providing the interior of the channels semi-circular and thereby increasing the flow into the inspection gallery 11, I find that there will not be a tendency for the water to rise to a height within the tile channels which prevents the air from entering at the ends of the channels and continuously feeding upwardly through the apertures 26 and the spaces between the cover plates 22. The inspection galleries 10 and 11 allow the attendant to look through the channels from the ends for inspection, thereby ascertaining whether the same are being clogged by any solid material that has passed from the filtering material 25 through the openings 26 or spaces 31 between the cover plates.

Without further elaboration, the foregoing will so fully explain the gist of my invention that others may, by applying current knowledge, readily adapt the same for use under varying conditions of service, without eliminating certain features which may properly be said to constitute the essential items of novelty involved, which items are intended to be defined and secured to me by the following claims:

I claim:

1. An underdrain construction comprising a floor, a series of troughs placed end to end upon said floor to form a drain channel, and a series of flat covers disposed relatively flush with and placed to cover said channel, said covers being apertured to permit liquids to drain therethrough into said troughs and to admit air from said troughs to the material supported above said covers, the area at the sides of said channel being filled to the height of the top of said covers with substantially non-permeable material.

2. An underdrain construction comprising a floor, a series of troughs placed end to end upon said floor to form a drain channel, and a series of covers of kiln-burned or concreted material placed to cover said channel, said covers being apertured to permit liquids to drain therethrough into said troughs and to admit air from said troughs to the material supported above said covers, said channels being straight and open from end to end to facilitate inspection and cleaning and being accessible without disturbing the material above the channels.

3. An underdrain construction comprising a floor, a series of troughs placed end to end upon said floor to form a drain channel, and a series of covers placed to cover said channel, said covers being apertured to permit liquids to drain therethrough into said troughs and to admit air from the troughs to material supported above said covers, the area at the sides of said channel being filled to the height of the top of said covers with substantially non-permeable material, said channels being straight and open from end to end to facilitate inspection and cleaning and being accessible without disturbing the material above said channels.

4. An underdrain construction comprising a floor, a series of troughs placed end to end upon said floor to form a drain channel, and a series of covers placed to cover said channel, said covers being apertured to permit liquids to drain therethrough into said troughs and to admit air from said troughs to the material supported above said covers, the sides of said troughs having shoulders for supporting said covers so that the upper surface of said covers is substantially flush with the tops of the troughs.

5. An underdrain construction comprising a floor, a series of troughs placed end to end upon said floor to form a drain channel, and a series of covers placed to cover said channel, said covers being apertured to permit liquids to drain therethrough into said troughs and to admit air from the troughs to the material supported above said covers, the area at the sides of said channel being filled to the height of the top of said covers with substantially non-permeable material, the sides of said troughs having shoulders for supporting said covers so that the upper surface of said covers is substantially flush with the top of the troughs.

6. An underdrain construction comprising a floor, a series of troughs placed end to end upon said floor to form a drain channel, and a series of covers placed to cover said channel, said covers being apertured to permit liquids to drain therethrough into the troughs and to admit air from said troughs to the material supported above said covers, the area at the sides of said channel being filled to the height of the top of said covers with substantially non-permeable material, said troughs being so constructed as to provide each with a base or solid bearing surface to prevent its tipping or rolling while being imbedded.

7. An underdrain construction comprising a floor, a series of troughs placed end to end upon said floor to form a drain channel, and a series of covers placed to cover said channel, said covers being apertured to permit liquids to drain therethrough into said troughs and to admit air from said troughs to the material supported above said covers, the area at the sides of said channel being filled to the height of the top of said covers with substantially non-permeable material, the said troughs being so constructed as to provide each with a base having portions projecting laterally below a concave periphery.

8. An underdrain construction comprising a floor, a series of troughs placed end to end upon said floor to form a plurality of drain channels, and a series of covers placed to cover said channels, said covers being spaced apart a predetermined distance to permit liquids to drain therethrough into said troughs and to admit air from the troughs to the material supported above the covers.

9. An underdrain construction for a trickling filter comprising a filtering bed support upon which filtering material is adapted to be placed, a plurality of troughs forming underdrain channels permanently imbedded in and disposed below the surface of said support whereby the effluent or other substances will drain directly into the troughs.

10. An underdrain construction for a trickling filter comprising a filtering bed support upon which filtering material is adapted to be placed, a plurality of troughs forming underdrain channels permanently imbedded in and disposed below the surface of said support whereby the effluent or other substances will drain directly into the troughs, and a gallery at one end of said filtering bed into which said troughs are adapted to drain.

11. An underdrain construction for a trickling filter comprising a filtering bed support, a plurality of troughs forming underdrain channels disposed in permanent relation below the surface of said support and apertured covers for said troughs.

12. An underdrain construction for a trickling filter, comprising a filtering bed support, a plurality of troughs forming underdrain channels disposed in permanent relation below the surface of said support, and covers for said channels, said covers being provided with upwardly tapered apertures.

13. An underdrain construction for a trickling filter, comprising a filtering bed support upon which filtering material is adapted to be placed, a plurality of troughs forming underdrain channels imbedded in and disposed below the surface of said support whereby the effluent or other substances will drain directly into the troughs, and galleries into which both ends of said channels open.

14. A trough adapted for use in an underdrain construction for a trickling filter comprising a U-shaped body portion provided with oppositely disposed shoulders along the interior edges, and an apertured cover plate for seating on said shoulders, said cover plate being flush with the top of said trough.

15. An underdrain construction comprising a floor, and a plurality of channels so formed as to have a permanently fixed relation upon the floor, and a filling of impervious material embedding the channels and forming therewith a substantially flat filtering bed support, said filling material being substantially flush with the tops of said channels.

In witness whereof, I have hereunto subscribed my name.

WILLIAM P. RAWN.

liquids to drain therethrough into said troughs and to admit air from said troughs to the material supported above said covers, the area at the sides of said channel being filled to the height of the top of said covers with substantially non-permeable material. the said troughs being so constructed as to provide each with a base having portions projecting laterally below a concave periphery.

8. An underdrain construction comprising a floor, a series of troughs placed end to end upon said floor to form a plurality of drain channels, and a series of covers placed to cover said channels, said covers being spaced apart a predetermined distance to permit liquids to drain therethrough into said troughs and to admit air from the troughs to the material supported above the covers.

9. An underdrain construction for a trickling filter comprising a filtering bed support upon which filtering material is adapted to be placed, a plurality of troughs forming underdrain channels permanently imbedded in and disposed below the surface of said support whereby the effluent or other substances will drain directly into the troughs.

10. An underdrain construction for a trickling filter comprising a filtering bed support upon which filtering material is adapted to be placed, a plurality of troughs forming underdrain channels permanently imbedded in and disposed below the surface of said support whereby the effluent or other substances will drain directly into the troughs, and a gallery at one end of said filtering bed into which said troughs are adapted to drain.

11. An underdrain construction for a trickling filter comprising a filtering bed support, a plurality of troughs forming underdrain channels disposed in permanent relation below the surface of said support and apertured covers for said troughs.

12. An underdrain construction for a trickling filter, comprising a filtering bed support, a plurality of troughs forming underdrain channels disposed in permanent relation below the surface of said support, and covers for said channels, said covers being provided with upwardly tapered apertures.

13. An underdrain construction for a trickling filter, comprising a filtering bed support upon which filtering material is adapted to be placed, a plurality of troughs forming underdrain channels imbedded in and disposed below the surface of said support whereby the effluent or other substances will drain directly into the troughs, and galleries into which both ends of said channels open.

14. A trough adapted for use in an underdrain construction for a trickling filter comprising a U-shaped body portion provided with oppositely disposed shoulders along the interior edges, and an apertured cover plate for seating on said shoulders, said cover plate being flush with the top of said trough.

15. An underdrain construction comprising a floor, and a plurality of channels so formed as to have a permanently fixed relation upon the floor, and a filling of impervious material embedding the channels and forming therewith a substantially flat filtering bed support, said filling material being substantially flush with the tops of said channels.

In witness whereof, I have hereunto subscribed my name.

WILLIAM P. RAWN.

Certificate of Correction.

It is hereby certified that in Letters Patent No. 1,584,142, granted May 11, 1926, upon the application of William P. Rawn, of Washington, Iowa, for an improvement in "Underdrains for Trickling Filters," an error appears in the printed specification requiring correction as follows: Page 3, lines 59 and 60, claim 2, strike out the words " of kiln-burned or concreted material "; and that the said Letters Patent should be read with this correction therein that the same may conform to the record of the case in the Patent Office.

Signed and sealed this 15th day of June, A. D. 1926.

[SEAL.]

M. J. MOORE,
Acting Commissioner of Patents.

Certificate of Correction.

It is hereby certified that in Letters Patent No. 1,584,142, granted May 11, 1926, upon the application of William P. Rawn, of Washington, Iowa, for an improvement in "Underdrains for Trickling Filters," an error appears in the printed specification requiring correction as follows: Page 3, lines 59 and 60, claim 2, strike out the words " of kiln-burned or concreted material "; and that the said Letters Patent should be read with this correction therein that the same may conform to the record of the case in the Patent Office.

Signed and sealed this 15th day of June, A. D. 1926.

[SEAL.]

M. J. MOORE,
*Acting Commissioner of Patents.*